Figure 1:
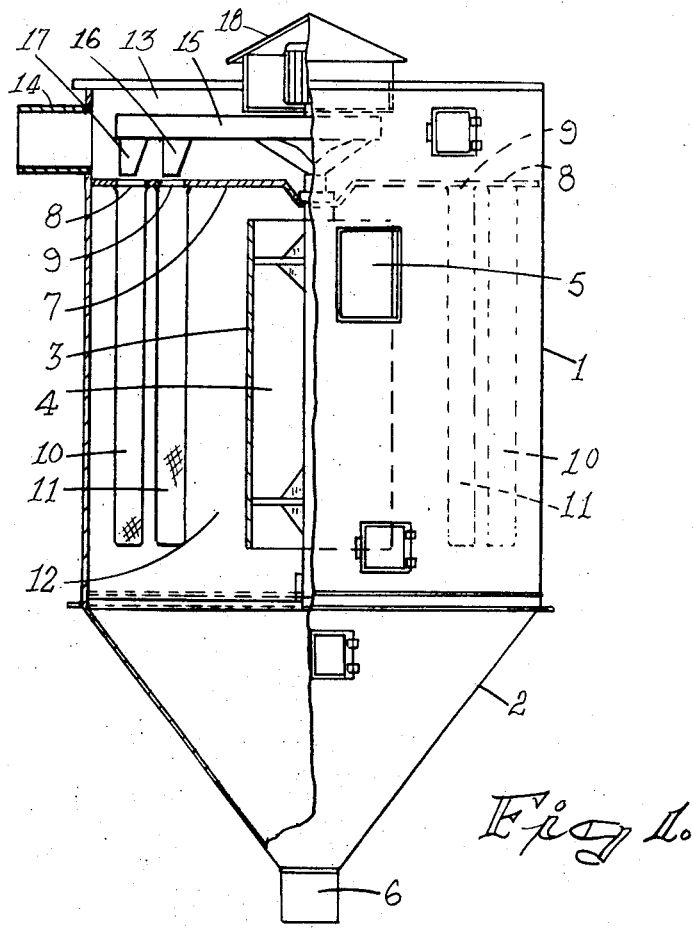

United States Patent [19]
Bourne

[11] 3,793,811
[45] Feb. 26, 1974

[54] FILTERS FOR SEPARATING DUST FROM AIR

[75] Inventor: Ronald Frederick Bourne, Morningside, Transvaal, South Africa

[73] Assignee: The Asbestos Grading Equipment Company (South Africa) (Proprietary) Limited, Johannesburg, Transvaal, South Africa

[22] Filed: Apr. 28, 1972

[21] Appl. No.: 248,433

[30] Foreign Application Priority Data
May 3, 1971 South Africa.............................. 2874

[52] U.S. Cl...................... 55/294, 55/302, 55/335, 55/341, 55/432
[51] Int. Cl............................................. B01d 46/04
[58] Field of Search ....... 55/96, 294, 302, 303, 321, 55/334–337, 341, 432

[56] References Cited
UNITED STATES PATENTS
2,406,733  9/1946  Acheson................................ 55/294
3,541,764  11/1970  Astrom.................................. 55/294
3,695,007  10/1972  Farnworth........................... 55/294

Primary Examiner—Bernard Nozick
Attorney, Agent, or Firm—Ostrolenk, Faber, Gerb & Soffen

[57] ABSTRACT

This invention relates to industrial filters for separating solid particles entrained in a gas, particularly dust in air. The invention resides in the provision of a filter chamber in an outer annular region of a casing and a contaminated air inlet on a central region surrounded by the filter chamber, which is directly converse to normal arrangement for filters of this type. Circular rows of filter bags are located in the outer annular region and a rotary air jet is provided for creating sequential back pressure in the bags of the rows. By locating the filter chamber in the outer region of the casing a greater space is available for filter bags in a casing of given size than where the filter chamber is centrally located and improved efficiency of the filter is obtained.

4 Claims, 2 Drawing Figures

FILTERS FOR SEPARATING DUST FROM AIR

This invention relates to filters for separating dust from air.

A conventional type of filter comprises an outer annular chamber having a tangential inlet for the incoming dust-laden air. The heavier particles are discharged from this zone under gravity and the dust-laden air then passes into an inner zone or filter chamber of circular cross-section which houses a plurality of elongated filter bags. The air passes through the bag walls and upwards to an outlet zone and the dust is trapped on the outer surfaces of the bags.

With this type of filter the upper ends of the bags are mounted in apertures in a plate which separates the filter chamber from a plenum chamber for clean air and it is conventional practice to provide a slowly rotating arm in the plenum chamber which sweeps across the open mouths of the bags. The arm is provided with suitably positioned nozzles through which jets of air are injected downwards into the bags in sequence. By this means, the dust collected is forced off the outer surfaces of the bags to drop into the bottom of the unit from whence it is swept to a discharge point.

It will be appreciated that to obtain the maximum efficiency for this filter design a substantial bag surface area is required and a considerable number of bags have to be employed and packed into the inner zone or filter chamber provided for them. In practice, the bags are arranged in circular rows and there are several concentric rows of bags employed.

The total volume of air entering the filter per unit of time is the sum of the volume entering the outer annular zone and the volume required to clean the bags and which is injected into them via the rotating arm. The volume of cleaning air is dependent — *inter alia* — on the number of concentric rows of bags which are swept by the rotating arm. For example, if there are two rows of bags, the volume of air required to clean them will be only two-thirds of the volume required to clean three rows. It follows that if the number of rows can be reduced without at the same time diminishing the total bag surface area, the volume of air required to clean the bags can be reduced. The result will be that the velocity of the dust-laden airstream passing inwards through the bag walls can be reduced and that there will be less resistance to flow. Efficiency will thereby be improved.

Alternatively, the volume of dust-laden air entering to be filtered can be increased proportionately to the reduction in the volume of air required to clean the bags and, again, efficiency will be improved.

In accordance with the invention, a filter of the kind comprising a casing providing a filter chamber in which a series of filter bags are disposed and a receiving chamber for receiving incoming dust-laden air is characterised in that the receiving chamber constitutes an inner zone of the casing and the filter chamber an outer zone surrounding the receiving chamber.

Further, according to the invention, the filter comprises a casing, a tubular wall mounted upright within the casing and providing a receiving chamber presenting at least a lower outlet into the casing, an inlet for dust-laden air extending through the wall of the casing and into the receiving chamber, a series of filter bags suspended in the outer space of the casing between the tubular wall and the casing wall, a compartment in the upper end of the casing for receiving clean air emerging from the upper ends of the filter bags, and an outlet from such compartment.

Preferably the casing and tubular wall are circular in cross-section, the wall being co-axial with the casing and the inlet to the receiving chamber being tangential thereto.

With this arrangement, it is possible to dispose the filter bags around the circumference of a circle or circles which is, or are, of considerably greater diameter than has been possible hitherto for any given overall diameter of the unit. It is thus possible to use the same number of filter bags as before, thus providing the same surface area, but to utilise fewer concentric rows. Alternatively, it is possible to use the greater number of rows as before and to obtain a greater capacity from the larger bag area from a given casing diameter. In this case the enlarged spaces for filter bags permitted by the central pre-collection or receiving chamber, permit a lower or upward entrainment velocity of the air stream and a consequent minimisation of the entrainment of contaminant particles.

Preferably, both ends of the tubular duct are open.

The filter of the invention will normally employ the conventional type of rotating arm provided with nozzles through which air is forced into the filter bags from the top in order to clean the exterior walls of the bags.

Figure 2:
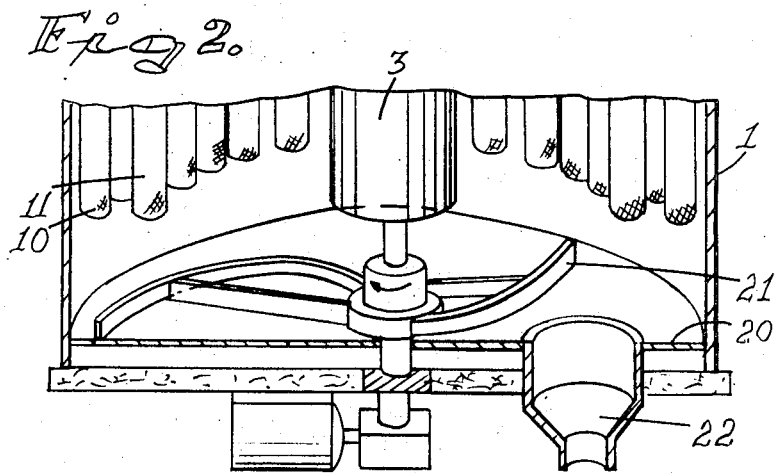

In order to illustrate the invention, two examples thereof will now be described with reference to the accompanying drawings in which FIG. 1 is a side view, with parts broken away, of a filter according to the invention; and FIG. 2 is a perspective view of the lower part of an alternative form of filter.

Referring to FIG. 1, the filter comprises a casing 1 of circular cross-section having a hopper-type base 2. Disposed within the casing and co-axial therewith is a circular wall 3 which is open at both ends, the wall providing an inner receiving chamber 4 within the casing. An inlet duct 5 for dust-laden air extends through the casing wall and tangentially into the receiving chamber 4 so that larger particles are separated in the receiving chamber and are deposited via outlet 6 in the base 2 while the air still containing finer dust particles escapes via the open upper and lower ends of the receiving chamber.

Towards the upper end of the casing there is a separating wall 7 provided with circular rows of apertures 8 and 9 concentrically arranged. From each of these apertures there is suspended an elongated filter bag so that the concentric rows of filter bags 10 and 11 are disposed in a filter chamber 12 surrounding the circular wall 3. It will be understood that a substantially larger number of bags of equal size can be located in the two concentric rows as illustrated than any two other concentric rows of smaller diameter. In fact, two rows of filter bags 10 and 11 as illustrated give the required bag surface area that could only be provided by three rows were an inner filter chamber to be used.

The separating wall 7 provides a compartment or plenum chamber 13 for receiving clean air from the open upper ends 8 and 9 of the filter bags. Flow through the filter may be caused by a fan (not shown) provided in outlet 14 from the plenum chamber so that air in the filter chamber 12 is drawn through the bags where dust particles are trapped on the outer surfaces of the latter enabling clean air to pass on through the open mouths of the bags into the plenum chamber and out via the outlet 14.

In order to clean the bags, a known arrangement is provided comprising a rotating tubular arm 15 equipped with nozzles 16 and 17 through which jets of air may be outwardly directed. Since only two jets of air are required, less cleaning air is used than in filters of equal size where three rows of bags are provided. A motor for rotating the arm 15 and a fan for driving the cleaning air therethrough are located in housing 18. Nozzle 16 is placed on the same radius as the row of filter bags 10 while nozzle 17 is on the same radius as the inner row of filter bags 11. As the arm sweeps across the open mouths of the filter bags the bags of each row have jets of air directed into them in sequence countercurrent to the above direction of flow towards the outlet 14. Thus, a backwashing effect occurs in one bag at a time in each row causing dust trapped on the outer surfaces of the bags to be dislodged so that the dust particles gravitate through outlet 6.

Referring to FIG. 2, an identical filter to that illustrated in FIG. 1 is provided except that a flat base 20 replaces the hopper-type base 2 and a rotary sweeping mechanism 21 is provided for raking displaced dust towards an outlet 22.

We claim:

1. An air filter, comprising: an enclosing casing; a generally horizontal separating wall passing across the interior of the casing and defining a lower filter chamber and an upper plenum chamber;

within said filter chamber are a plurality of filter bags disposed in at least one circular row; along its length each said bag includes openings which are sufficiently large to permit air to pass therethrough and into the bag and sufficiently small to block particles from passing therethrough and causing particles to adhere to the exterior surfaces of the bag within said filter chamber; each said filter bag is fully closed in said filter chamber and opens through said separating wall into said plenum chamber via orifices in said separating wall;

an initial receiving chamber within said filter chamber for initially receiving incoming dust-laden air; said receiving chamber being defined by a surrounding wall; said receving chamber is smaller in width than said casing and than the circular rows of said filter bags, and said receiving chamber is generally centrally disposed with respect to said filter bag; an inlet duct communicates with said receiving chamber through said filter chamber and through said casing externally of said air filter and communicates into said receiving chamber substantially tangentially with respect to its surrounding wall; said receiving chamber has an outlet spaced from its said inlet and which communicates into said filter chamber, through which said outlet dust laden air may pass from said receiving chamber;

an air outlet from said plenum chamber communicates externally of said casing and said air filter to be operated upon by a blower means for causing air to flow through said filter;

a tubular, rotary arm in said plenum chamber; means for rotating said tubular arm around said plenum chamber to sweep said arm over all said orifices in said separating wall; blower means communicate with said tubular arm for conveying blasts of cleansed air into said filter bags via said orifices therefor for dislodging dust particles trapped on the outer surfaces of said filter bags as said arm moves past said orifices.

2. The filter of claim 1 in which the casing and tubular wall are circular in cross-section, the wall being coaxial with the casing and the inlet to the receiving chamber being tangential thereto.

3. The filter of claim 1, wherein said receiving chamber surrounding wall is a tubular wall extending downwardly from said separating wall; said receiving chamber tubular wall is open both at its top end near said separating wall and at its bottom end away from said separating wall; said inlet duct to said receiving chamber communicates therewith intermediate the said ends of that said chamber.

4. The filter of claim 3, wherein said filter bags each extend downwardly from said separating wall a substantial distance approximating the said bottom end of said receiving chamber, thereby to provide elongated filter bags, to enlarge the surface area through which air may be passed from said filter chamber.

* * * * *